United States Patent
Kudekar et al.

(10) Patent No.: US 9,664,773 B2
(45) Date of Patent: May 30, 2017

(54) UTILIZING A MOBILE DEVICE TO LEARN PARAMETERS OF A RADIO HEAT MAP

(71) Applicant: QUALCOMM Incorporated, San Diego, CA (US)

(72) Inventors: Shrinivas S. Kudekar, Bridgewater, NJ (US); Cyril Measson, New Providence, NJ (US); Ravi Palanki, Cupertino, CA (US); Thomas Joseph Richardson, South Orange, NJ (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/067,847

(22) Filed: Oct. 30, 2013

(65) Prior Publication Data
US 2015/0119068 A1    Apr. 30, 2015

(51) Int. Cl.
| | | |
|---|---|---|
| *G01S 5/02* | (2010.01) | |
| *H04W 64/00* | (2009.01) | |
| *H04W 4/04* | (2009.01) | |

(52) U.S. Cl.
CPC .......... *G01S 5/0252* (2013.01); *G01S 5/0236* (2013.01); *G01S 5/0278* (2013.01); *H04W 4/043* (2013.01); *H04W 64/00* (2013.01)

(58) Field of Classification Search
None
See application file for complete search history.

(56) References Cited

U.S. PATENT DOCUMENTS

| | | | | |
|---|---|---|---|---|
| 6,263,208 | B1* | 7/2001 | Chang | H04W 64/00 342/357.31 |
| 8,295,846 | B2* | 10/2012 | Hwang | G01S 5/06 455/446 |
| 2005/0124354 | A1* | 6/2005 | Durgin | H04W 64/00 455/456.1 |
| 2005/0136845 | A1* | 6/2005 | Masuoka | G01S 5/0294 455/67.14 |
| 2005/0208952 | A1* | 9/2005 | Dietrich | G01S 5/0221 455/456.1 |
| 2006/0019679 | A1* | 1/2006 | Rappaport | H04W 64/00 455/456.5 |
| 2008/0166973 | A1* | 7/2008 | Hart | H04W 16/18 455/67.11 |
| 2009/0011779 | A1 | 1/2009 | MacNaughtan et al. | |
| 2011/0034179 | A1 | 2/2011 | David et al. | |
| 2011/0090123 | A1* | 4/2011 | Sridhara | G01S 5/0252 342/450 |
| 2012/0040602 | A1 | 2/2012 | Charland | |
| 2012/0182144 | A1 | 7/2012 | Richardson et al. | |

(Continued)

FOREIGN PATENT DOCUMENTS

WO    2012166032 A1    12/2012

OTHER PUBLICATIONS

International Search Report and Written Opinion—PCT/US2014/062307—ISA/EPO—Feb. 3, 2015.

*Primary Examiner* — Hilina K Demeter
(74) *Attorney, Agent, or Firm* — Linda G. Gunderson

(57) ABSTRACT

Example methods, apparatuses, or articles of manufacture are disclosed herein that may be utilized, in whole or in part, to facilitate or support one or more operations or techniques for utilizing a mobile communication device to learn parameters of a radio heat map for use in or with a mobile communication device.

26 Claims, 4 Drawing Sheets

(56) References Cited

U.S. PATENT DOCUMENTS

| | | | |
|---|---|---|---|
| 2013/0005297 A1* | 1/2013 | Sanders | G01S 13/765 |
| | | | 455/406 |
| 2013/0029685 A1 | 1/2013 | Moshfeghi | |
| 2013/0053066 A1* | 2/2013 | Khorashadi | H04W 4/04 |
| | | | 455/456.2 |
| 2013/0053067 A1* | 2/2013 | Aggarwal | H04W 64/00 |
| | | | 455/456.2 |
| 2013/0143588 A1 | 6/2013 | Flanagan et al. | |
| 2014/0228048 A1* | 8/2014 | Saito | G01S 5/021 |
| | | | 455/456.1 |

* cited by examiner

UTILIZING A MOBILE DEVICE TO LEARN PARAMETERS OF A RADIO HEAT MAP

BACKGROUND

1. Field

The present disclosure relates generally to indoor position or location estimations of mobile communication devices and, more particularly, to techniques for utilizing a mobile device to learn parameters of a radio heat map for use in or with mobile communication devices.

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users in estimating their geographic locations by providing positioning assistance data obtained or gathered from various systems. For example, in an outdoor environment, certain mobile communication devices may obtain an estimate of their geographic location or so-called "position fix" by acquiring wireless signals from a satellite positioning system (SPS), such as the global positioning system (GPS) or other like Global Navigation Satellite Systems (GNSS), cellular base station, etc. via a cellular telephone or other wireless communications network. Acquired wireless signals may, for example, be processed by or at a mobile communication device, and its location may be estimated using known techniques, such as Advanced Forward Link Trilateration (AFLT), base station identification, or the like.

In an indoor environment, certain mobile communication devices may be unable to reliably receive or acquire satellite or like wireless signals to facilitate or support one or more position estimation techniques. At times, an indoor location of a mobile communication device may be estimated via radio heat map signature matching, for example, in which current characteristics of wireless signals received at the device are compared with expected or previously measured signal characteristics stored as heat map values in a database. In some instances, however, such as in larger indoor or like environments with multiple floors, access points, or feasible routes, for example, a radio heat map may be quite voluminous or comprehensive so as to tax available bandwidth in wireless communication links, memory of a mobile communication device, or the like. This may, for example, increase power consumption of mobile communication devices with limited power resources (e.g., battery-operated, etc.), thus, affecting operating lifetime or overall utility of such devices.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
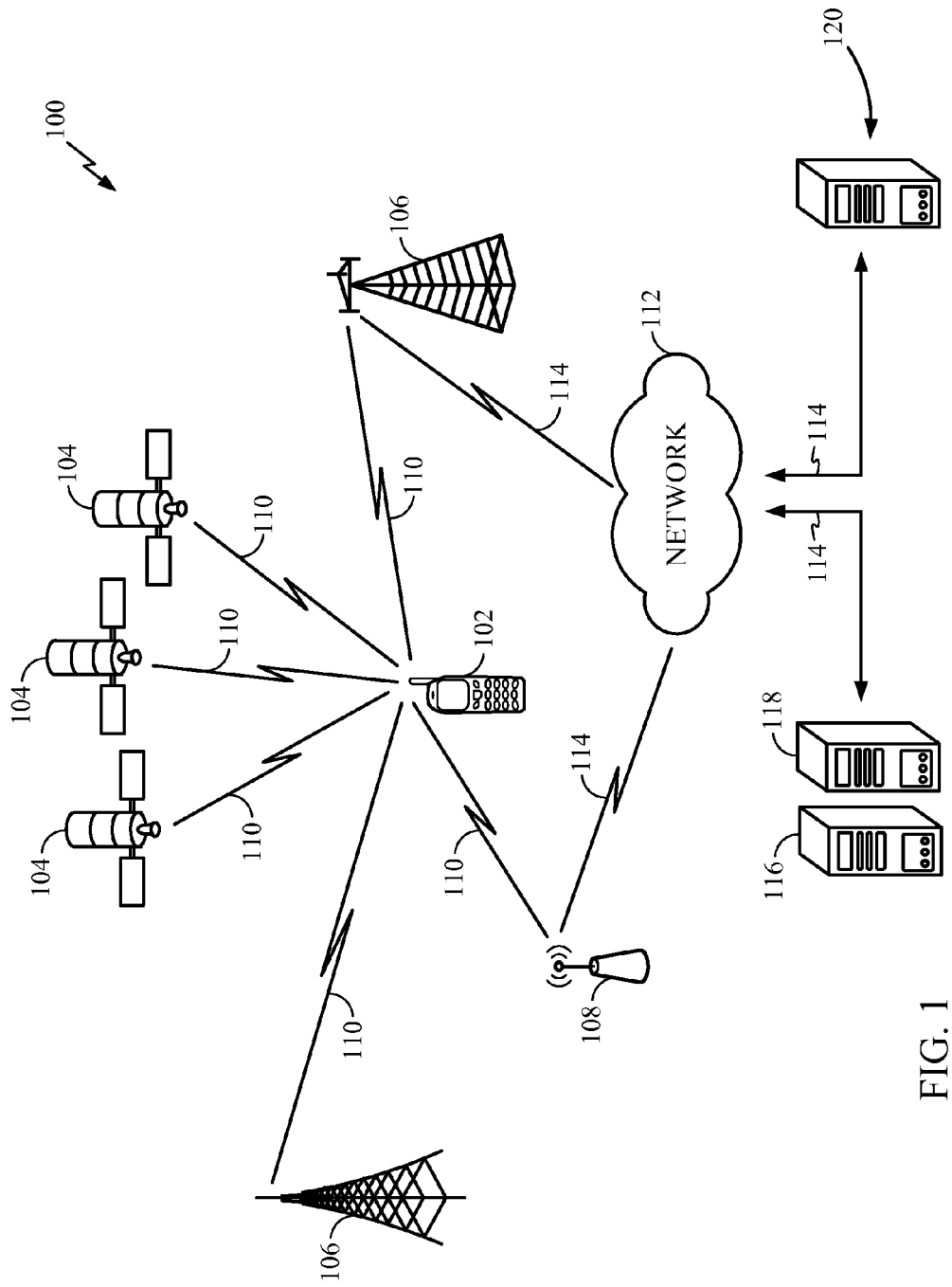
FIG. 1 is a schematic diagram illustrating features associated with an implementation of an example operating environment.

Example implementations relate to techniques for utilizing a mobile device to learn parameters of a radio heat map. In one implementation, a method may comprise receiving, at a mobile device, one or more messages from a server via an electronic communications network, the one or more messages comprising at least locations of one or more wireless transmitters transmitting signals in an area and an electronic digital map of the area; estimating parameters of a signal strength propagation model of at least one of the signals transmitted from at least one of the one or more wireless transmitters based, at least in part, on the locations of the one or more wireless transmitters and the electronic digital map of the area; and communicating the estimated parameters to the server via the electronic communications network.

In another implementation, an apparatus to learn parameters of a radio heat map may comprise a mobile device comprising a wireless transceiver to communicate with an electronic communications network; and one or more processors to communicate with the electronic communications network to receive one or more messages from a server via the electronic communications network, the one or more messages comprising at least locations of one or more wireless transmitters transmitting signals in an area and an electronic digital map of the area; estimate parameters of a signal strength propagation model of at least one of the signals transmitted from at least one of the one or more wireless transmitters based, at least in part, on the locations of the one or more wireless transmitters and the electronic digital map of the area; and communicate the estimated parameters to the server via the electronic communications network.

In yet another implementation, an apparatus to learn parameters of a radio heat map may comprise means for receiving, at a mobile device, one or more messages from a server via an electronic communications network, the one or more messages comprising at least locations of one or more wireless transmitters transmitting signals in an area and an electronic digital map of the area; means for estimating parameters of a signal strength propagation model of at least one of the signals transmitted from at least one of the one or more wireless transmitters based, at least in part, on the locations of the one or more wireless transmitters and the electronic digital map of the area; and means for communicating the estimated parameters to the server via the electronic communications network.

In yet another implementation, an article may comprise a non-transitory storage medium having instructions executable by a processor to receive, at a mobile device, one or more messages from a server via an electronic communications network, the one or more messages comprising at least locations of one or more wireless transmitters transmitting signals in an area and an electronic digital map of the area; estimate parameters of a signal strength propagation model of at least one of the signals transmitted from at least one of the one or more wireless transmitters based, at least in part, on the locations of the one or more wireless transmitters and the electronic digital map of the area; and communicate the estimated parameters to the server via the electronic communications network. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations or techniques for utilizing a mobile communication device to learn parameters of a radio heat map. As used herein, "mobile device," "mobile communication device," "wireless device," "location-aware mobile device," or the plural form of such terms may be used interchangeably and may refer to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, or the like. It should be appreciated, however, that these are merely examples of mobile devices that may be used, at least in part, to implement one or more operations or techniques for utilizing a mobile device to learn parameters of a radio heat map, and that claimed subject matter is not limited in this regard. It should also be noted that the terms "position" and "location" may be used interchangeably herein.

As alluded to previously, in an indoor environment or like partially or substantially enclosed areas (e.g., urban canyons, etc.), certain mobile devices may be unable to reliably receive or acquire satellite or like wireless signals to facilitate or support one or more position estimation techniques. For example, signals from an SPS or other wireless transmitters may be attenuated or otherwise affected in some manner (e.g., insufficient, weak, fragmentary, blocked, etc.), which may at least partially preclude their use for position estimations. As such, in an indoor environment, different techniques may be employed to enable navigation or location services. For example, a mobile device may obtain an indoor position fix by measuring ranges to three or more terrestrial wireless access points positioned at known locations. Ranges may be measured, for example, by obtaining a Media Access Control identifier (MAC ID) address from wireless signals received from wireless transmitters (e.g., access points, etc.) and measuring one or more characteristics of received signals, such as signal strength, round trip delay, or the like.

At times, an indoor location of a mobile device may be estimated via radio heat map signature matching, for example, in which current or live characteristics or signatures of wireless signals received at the mobile device are compared with expected or previously measured signal characteristics stored as radio heat map values in a database. For example, during an off-line stage, a particular indoor area may be surveyed, and radio heat map values, such as in the form of observed characteristics of wireless signals or so-called signal "signatures" indicative of received signal strength (e.g., RSSI, etc.), round-trip delay times (e.g., RTT, etc.), or the like may be collected or compiled. During an on-line stage, a mobile device may, for example, communicate currently received or live signal signatures to a local server for matching with previously measured signal characteristics. By finding a signal signature in a database that more closely matches characteristics exhibited by signals currently received at a mobile device, a location associated with a matching signature may be used as an estimated location of the device. A survey of an indoor or like environment, however, may involve taking detailed measurements, performing extensive calculations, etc., which may be labor-intensive, time-consuming, or computationally expensive.

In some instances, a radio heat map may, for example, be selectively provided or otherwise made available to a mobile device by an indoor navigation system, location server, etc. as part of positioning assistance data. A radio heat map may, for example, be provided in the form of heat map values or like metadata representing observed characteristics of wireless signals (e.g., RSSI, RTT, etc.) at particular locations in an indoor or like area of interest. A radio heat map may be defined by a grid of points laid over or mapped to a floor plan of an indoor or like area of interest at relatively uniform spacing (e.g., two-meter separation of neighboring grid points, etc.), for example, and representing expected signal signatures at these points. As was indicated, at times, a radio heat map may facilitate or support measurements of ranges to one or more wireless transmitters, such as one or more access points, for example, positioned at known fixed locations within an indoor or like area of interest. Thus, for a known wireless transmitter, a radio heat map may, for example, associate a particular grid point with a heat map value representative of an expected signal signature at the grid point. As such, heat map values associated with one or more known access points may, for example, enable a mobile device to correlate or associate observed signal signatures with locations within an indoor or like area of interest.

At times, an electronic digital map associated with an indoor or like area of interest may be selectively provided or otherwise made available to a mobile device by an indoor navigation system, suitable server, etc. as part of positioning assistance data. For example, an electronic digital map may be provided to a mobile device, such as by a suitable map server, at or upon entering a particular indoor or like area (e.g., a shopping mall, etc.), upon request, or the like. An electronic digital map may include, for example, floor plans comprising indoor features of an area, such as doors, hallways, staircases, elevators, walls, etc., as well as points of interest, such as restrooms, stores, entry ways, pay phones, or the like. In some instances, an electronic digital map may, for example, be stored at a suitable map server to be accessible by a mobile device, such as via a selection of a Uniform Resource Locator (URL), for example. By obtaining a digital map of an indoor or like area of interest, a mobile device may, for example, be capable of overlaying its current location over the displayed map of the area so as to provide an associated user with additional context, frame of reference, or the like.

To facilitate measurements of ranges to wireless transmitters (e.g., access points, etc.) positioned within an indoor or like area of interest, at times, it may be necessary or otherwise useful to have a relatively precise or otherwise sufficient knowledge of an associated radio heat map. As was indicated, an extensive site survey in an indoor or like environment may present a number of challenges, such as, for example, simulation or computation costs, time or effort involved, or the like. Thus, in some instances, to learn or develop a radio heat map for a particular area, one or more crowdsourcing techniques may, for example, be employed, in whole or in part. For example, a suitable server may develop a radio heat map for use as positioning assistance data in a particular area based, at least in part, on propagation parameters measured and communicated to the server by one or more mobile devices within the area. These mobile device-server communications, however, may tax available network bandwidth as well as associated computational resources, for example, which may affect processing or localization times, power consumption of a mobile device, or the like. Crowdsourcing may also raise privacy concerns since a server may be capable of determining locations of crowdsourcing mobile devices, such as while estimating propagation parameters of a radio heat map, for example.

Another challenge in learning or developing a radio heat map for a particular indoor or like environment may be its complexity. To illustrate, at times, application of RSSI radio heat map signature values to signals acquired from a wireless transmitter for use in obtaining a position fix presumes a known or predictable transmission power applied at the transmitter. In practice, however, transmission power at a wireless transmitter may vary or drift over time. For example, transmission power of a transmitter at an IEEE std. 802.11 access point may vary up to 21.0 dBm (e.g., −1.0 dBm to 20.0 dBm, etc.). This may negatively affect characterizations of signal strength as a function of range, for example, thus, making indoor positioning or navigation capabilities of certain mobile devices less useful or possibly faulty. Other factors affecting received signal power that may distort or affect range measurements may include, for example, non-uniform propagation losses arising from atmospheric conditions, signal diffraction, reflection, or scattering due to presence of walls or other obstructions between a transmitter and a receiver. Since a physical geometry of a propagation space of a particular area (e.g., a shopping mall, etc.) may not be homogeneous, meaning that different wireless transmitters (e.g., access points, etc.) within the area may have different sets of propagation parameters (e.g., transmission power, absorbed power, etc.), signal strength propagation models may differ from one wireless transmitter to another. As such, a particular indoor area may be defined or characterized by a plurality of different propagation models, which may depend on locations, capabilities, etc. of associated wireless transmitters. Again, this may, for example, make a process of learning or developing a radio heat map relatively time consuming or computationally expensive, waste available network bandwidth, memory of a mobile device or associated resources, or the like.

In addition, to facilitate or support ubiquitous indoor positioning, such as positioning in which a user of a mobile device may successfully or sufficiently obtain a position fix in a newly-encountered indoor or like area, for example, it may be useful or desirable to learn a radio heat map of the area concurrently or jointly with determining a location of the mobile device. To illustrate, in some instances, one or more parameters may, for example, be estimated at the same time with determining a location of a mobile device. Here, for example, one or more brute force-type methods or approaches may be utilized, in whole or in part. These methods or approaches, however, may also be computationally expensive or may introduce continuity or convergence issues, among other things. Accordingly, it may be desirable to develop one or more methods, systems, or apparatuses that may implement more effective or efficient ubiquitous indoor positioning, such as concurrently or jointly with learning a radio heat map, for example, while preserving privacy of location-aware mobile devices.

Thus, as will be described in greater detail below, in an implementation, positioning assistance data comprising locations of one or more wireless transmitters (e.g., IEEE std. 802.11 access points, etc.) and an electronic digital map of an indoor or like area of interest may be obtained or received, such as at or by a mobile device, for example. For a particular wireless transmitter, a number of propagation parameters characterizing or defining signal strength as a function of range may, for example, be estimated or computed. In some instances, propagation parameters may comprise, for example, an estimated transmission power, an estimated propagation loss exponent, and an estimated power absorbed by a number of walls separating a transmitter from a location of a mobile device, just to illustrate one possible implementation.

As will also be seen, in estimating propagation parameters, a probabilistic approach may, for example, be utilized, at least in part, or otherwise considered. Namely, propagation parameters may, for example, be treated as or otherwise considered to be Gaussian distributed, meaning that the parameters may be advantageously represented in terms of a mean and a covariance of a Gaussian distribution. For example, in at least one implementation, propagation parameters may be estimated or computed according to a least mean square error (LMSE) technique forming a three-by-three covariance matrix, though claimed subject matter is not so limited. Based, at least in part, on estimated parameters, expected RSSI values at suitable locations within an indoor or like area of interest may, for example, be computed as part of a radio heat map. A radio heat map may be subsequently provided, such as by a suitable server, for example, to a new user as part of positioning assistance data for more effective or efficient localization. In some instances, one or more propagation parameters may, for example, be estimated or otherwise refined iteratively, just to illustrate another possible implementation.

FIG. 1 is a schematic diagram illustrating features associated with an implementation of an example operating environment 100 capable of facilitating or supporting one or more processes or operations for utilizing a mobile device, such as a mobile device 102, for example, to learn parameters of a radio heat map. It should be appreciated that operating environment 100 is described herein as a non-limiting example that may be implemented, in whole or in part, in the context of various electronic communications networks or combination of such networks, such as public networks (e.g., the Internet, the World Wide Web), private networks (e.g., intranets), wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as urban canyons, town squares, amphitheaters, parking garages, rooftop gardens, patios, or the like. At times, one or more operations or techniques described herein may be performed, at least in part, in an outdoor environment.

As illustrated, operating environment 100 may comprise, for example, one or more satellites 104, base transceiver stations 106, wireless transmitters 108, etc. capable of communicating with mobile device 102 via wireless communication links 110 in accordance with one or more communication protocols. Satellites 104 may be associated with one or more satellite positioning systems (SPS), such as, for example, the United States Global Positioning System (GPS), the Russian GLONASS system, the European Galileo system, as well as any system that may utilize satellites from a combination of satellite systems, or any satellite system developed in the future. For example, satellites 104 may be from any one of several regional navigation satellite systems (RNSS') such as the Wide Area Augmentation System (WAAS), European Geostationary Navigation Overlay Service (EGNOS), Quasi-Zenith Satellite System (QZSS), etc. Base transceiver stations 106, wireless transmitters 108, etc. may be of the same or similar type, for example, or may represent different types of devices, such as access points, radio beacons, cellular base stations, femtocells, or the like, depending on an implementation.

Although not shown, in some instances, operating environment 100 may include, for example, a larger number of wireless transmitters 108 that may be associated with an indoor or like area of interest. A larger number of wireless transmitters 108 may correspond to or correlate with a more comprehensive radio heat map, for example. It should be noted that one or more wireless transmitters 108 may be capable of transmitting as well as receiving wireless signals. In a particular implementation, one or more wireless transmitters 108 may be capable of communicating with mobile device 102 at a shorter range than at a range enabled by base transceiver station 106. For example, one or more wireless transmitters 108 may be positioned in an indoor or like environment, as was indicated. One or more wireless transmitters 108 may, for example, provide access to a wireless local area network (WLAN, e.g., IEEE std. 802.11 network, etc.) or wireless personal area network (WPAN, e.g., Bluetooth® network, etc.). In another example implementation, one or more wireless transmitters 108 may comprise, for example, a femtocell transceiver capable of facilitating or supporting communication within operating environment 100 according to a cellular communication protocol.

In some instances, one or more base transceiver stations 106, wireless transmitters 108, etc. may, for example, be operatively coupled to an electronic communications network 112 that may comprise one or more wired or wireless communications or computing networks capable of providing suitable information, such as via one or more wireless communication links 114, 110, etc. As will be seen, provided information may include, for example, positioning assistance data, such as a radio heat map, recent position fix obtained via an SPS, one or more propagation parameters, a covariance matrix, or the like. At times, provided information may include, for example, locations of one or more wireless transmitters 108, an electronic digital map, etc. to facilitate or support one or more operations or processes associated with operating environment 100. Positioning assistance data may, for example, be provided in the form of a look-up table, mathematical formula, parameters of a propagation model, suitable algorithm, metadata, etc., which may depend, at least in part, on an application, network, environment, radio heat map, mobile device, or the like.

In an implementation, network 112 may be capable of facilitating or supporting communications between suitable computing platforms or devices, such as, for example, mobile device 102, one or more base transceiver stations 106, wireless transmitters 108, as well as one or more servers associated with operating environment 100. In some instances, servers may include, for example, a location server 116, positioning assistance server 118, as well as one or more other servers, indicated generally at 120 (e.g., navigation, information, map, etc. server, etc.), capable of facilitating or supporting one or more operations or processes associated with operating environment 100. In a particular implementation, network 112 may comprise, for example, Internet Protocol (IP) infrastructure capable of facilitating a communication between mobile device 102 and servers 116, 118, or 120 via wireless transmitter 108, base transceiver station 106 (e.g., via a network interface, etc.), or the like. In another implementation, network 112 may comprise cellular communication network infrastructure, such as, for example, a base station controller or master switching center (not shown) to facilitate mobile cellular communication with mobile device 102.

Location server 116 may provide an estimate of a coarse location of mobile device 102 within an indoor or like area of interest associated with operating environment 100, such as at or upon entry of the area, for example. A coarse location may, for example, be determined based, at least in part, on last or recent position fix obtained via an SPS, input provided by an associated user, or the like. For example, at times, a coarse location of mobile device 102 may be determined using a proximity to one or more reference points, such as by knowing which wireless transmitter 108, etc. mobile device 102 is using at a given time. As discussed below, in some instances, mobile device 102 may utilize its coarse location, in whole or in part, in subsequent messages with a suitable server, such as servers 116, 118, or 120, for example, to obtain an electronic digital map or other information relevant to an area identified by a coarse location (e.g., a routing graph, etc.). Optionally or alternatively, a coarse location of mobile device 102 may, for example, be determined, at least in part, on mobile device 102 using one or more applicable techniques (e.g., dead reckoning, etc.). In some instances, such as in addition to or instead of determining a coarse location via one or more applicable approaches, for example, mobile device 102 may communicate MAC addresses of one or more known (e.g., visible, etc.) wireless transmitters 108, etc. to a suitable server, and may be provided an electronic digital map of an associated area. Mobile device 102 may, for example, estimate its current location in an indoor or like area of interest based, at least in part, on provided map and known wireless transmitters 108, etc. using one or more appropriate techniques.

Positioning assistance server 118 may, for example, provide positioning assistance data, such as locations of one or more wireless transmitters 108, a radio heat map, associated parameters, or the like. For example, positioning assistance server 118 may provide locations of one or more wireless transmitters 108 via a suitable reference frame, such as (X, Y, Z) coordinates in three-dimensional Cartesian coordinate space that may or may not be mapped according to a global coordinate system, just to illustrate one possible implementation. Of course, claimed subject matter is not limited to a particular reference frame or positioning assistance data.

Server 120, such as a map server, for example, may provide an electronic digital map for a particular indoor or like area of interest. An electronic digital map may comprise, for example, a floor plan of an area or a portion thereof. By way of non-limiting example, an electronic digital map may include one or more computer-aided design (CAD) type files identifying structural features of an area, such as walls, rooms, doors, passageways, elevators, staircases, ladders, floors, ceilings, or the like. At times, an electronic digital map may comprise, for example, locations of one or more wireless transmitters 108, etc. relative to structural features (e.g., walls, doors, windows, etc.), composition or type of structural features (e.g., walls, doors, windows, etc.), or the like. For example, in some instances, such as at or upon entry of an indoor or like area of interest, upon user input, etc., mobile device 102 may communicate a request to server 120 (e.g., a map server, etc.) to provide an electronic digital map covering the area or adjacent areas, if applicable. A request may reference or otherwise include, for example, a coarse or current location of mobile device 102, as was indicated, such that server 120 (e.g., a map server, etc.) may associate the coarse or current location of mobile device 102 with a particular area, and then communicate a relevant map to mobile device 102. An electronic digital map may, for example, be used, at least in part, to determine a number of walls separating one or more wireless transmitters 108, etc. from an estimated location of mobile device 102, just to illustrate one possible implementation. Thus, parameters of an associated signal strength propagation model may, for example, be estimated based, at least in part, on a number of walls separating one or more wireless transmitters 108, etc. from an estimated location of mobile device 102 based, at least in part, on such an electronic digital map, as will also be seen.

In at least one implementation, positioning assistance data, such as, for example, a radio heat map, routing graph, electronic digital map, or the like may assist mobile device 102 in defining a propagation model within an indoor area that may be subject to physical obstructions (e.g., walls, dividers, etc.), passage ways (e.g., doorways, windows, etc. in walls, dividers, etc.), or the like. Here, mobile device 102 may, for example, apply suitable constraints or coefficients to aid in the application of filtering measurements for estimating locations or motion trajectories according to a suitable motion model (e.g., according to a particle filter, Kalman filter, etc.). In addition to measurements obtained via acquisition of signals from one or more wireless transmitters 108, according to a particular embodiment, mobile device 102 may also apply a motion model to measurements or inferences obtained from associated inertial sensors (e.g., accelerometers, gyroscopes, magnetometers, etc.) or ambient environment sensors (e.g., temperature sensors, microphones, barometric pressure sensors, ambient light sensors, camera imagers, etc.) in learning a radio heat map associated with operating environment 100, estimating a location or motion state of mobile device 102, or the like.

According to an embodiment, mobile device 102 may access or obtain suitable positioning assistance data via communications with servers 116, 118, or 120 by, for example, requesting the data through selection of a universal resource locator (URL), as previously mentioned. The terms "positioning assistance data" and "indoor navigation assistance data" may be used interchangeably herein. In particular implementations, servers 116, 118, or 120 may be capable of providing indoor navigation assistance data to cover many different indoor areas including, for example, floors of buildings, wings of hospitals, terminals at an airport, portions of a university campus, areas of a large shopping mall, just to name a few examples. As will also be seen, different indoor areas may, for example, be associated with different wireless transmitters 108 having different signal strength propagation models. Also, memory resources at mobile device 102 and data transmission resources may make receipt of indoor navigation assistance data for all areas served by servers 116, 118, or 120 impractical or infeasible; thus, a request for indoor navigation assistance data from mobile device 102 may indicate a course estimate of a location of mobile device 102, as was indicated. Mobile device 102 may then be provided indoor navigation assistance data covering areas proximate to a course estimate of a location of mobile device 102. Optionally or alternatively, MAC addresses of one or more known (e.g., visible, etc.) wireless transmitters 108, etc. may, for example, be communicated by mobile device 102 to a suitable server, such as for current location determination, as was also discussed.

In particular implementations and as discussed herein, mobile device 102 may have circuitry and processing resources capable of computing a position fix. For example, mobile device 102 may compute a position fix based, at least in part, on pseudorange measurements to four or more SPS satellites 104. Here, mobile device 102 may compute such pseudorange measurements based, at least in part, on pseudonoise code phase detections in signals 110 acquired from four or more SPS satellites 104, for example. In particular implementations, mobile device 102 may receive from servers 116, 118, or 120 positioning assistance data to aid in the acquisition of signals transmitted by SPS satellites 104 including, for example, almanac, ephemeris data, Doppler search windows, just to name a few examples.

In other implementations, mobile device 102 may, for example, obtain a position fix by processing signals received from one or more terrestrial wireless transmitters positioned at known fixed locations (e.g., wireless transmitter 108, base transceiver station 106, etc.) using any one of several techniques such as, for example, advanced forward trilateration (AFLT), observed time difference of arrival (OTDOA), or the like. In these particular techniques, a range from mobile device 102 may be measured to three or more of such transmitters based, at least in part, on pilot signals transmitted by the transmitters and received at mobile device 102. In some instances, locations or identities of one or more base transceiver stations 106, wireless transmitters 108, etc. in a particular area or areas associated with operating environment 100 may be provided by servers 116, 118, or 120 in the form of a base station almanac (BSA).

As was indicated, in some instances, mobile device 102 may not be capable of acquiring wireless signals from a sufficient number of SPS satellites 104 or perform AFLT, OTDOA, etc. to compute a position fix. Thus, at times, mobile device 102 may be capable of computing a position fix based, at least in part, on signals acquired from one or more terrestrial wireless transmitters 108 (e.g., WLAN access points positioned at known locations, etc.). For example, mobile devices may obtain a position fix by measuring ranges to three or more indoor terrestrial wireless access points positioned at known locations. Ranges may be measured, for example, by obtaining a MAC ID address from signals received from access points and obtaining range measurements to these access points by measuring one or more received signal characteristics (e.g., RSSI, RTT, etc.). In alternative implementations, mobile device 102 may obtain an indoor position fix by applying characteristics of acquired signals to a radio heat map indicating expected RSSI, RTT, or like signatures at particular locations in an indoor area. In particular implementations, a radio heat map may associate identities of one or more wireless transmitters 108 (e.g., a MAC address, which is discernible from a signal acquired from a local transmitter, etc.), expected RSSI from signals transmitted by the identified local transmitters, an expected RTT from the identified transmitters, means or standard deviations from these expected RSSI, RTT, etc. It should be understood, however, that these are merely examples of a radio heat map, and that claimed subject matter is not limited in this respect.

Even though a certain number of computing platforms or devices are illustrated herein, any number of suitable computing platforms or devices may be implemented to facilitate or otherwise support one or more techniques or processes associated with operating environment 100. For example, at times, network 112 may be coupled to one or more wired or wireless communications networks (e.g., Wi-Fi, etc.) so as to enhance a coverage area for communications with mobile device 102, one or more base transceiver stations 106, wireless transmitters 108, servers 116, 118, 120, or the like. In some instances, network 112 may facilitate or support femtocell-based operative regions of coverage, for example. Again, these are merely example implementations, and claimed subject matter is not limited in this regard.

Figure 2:
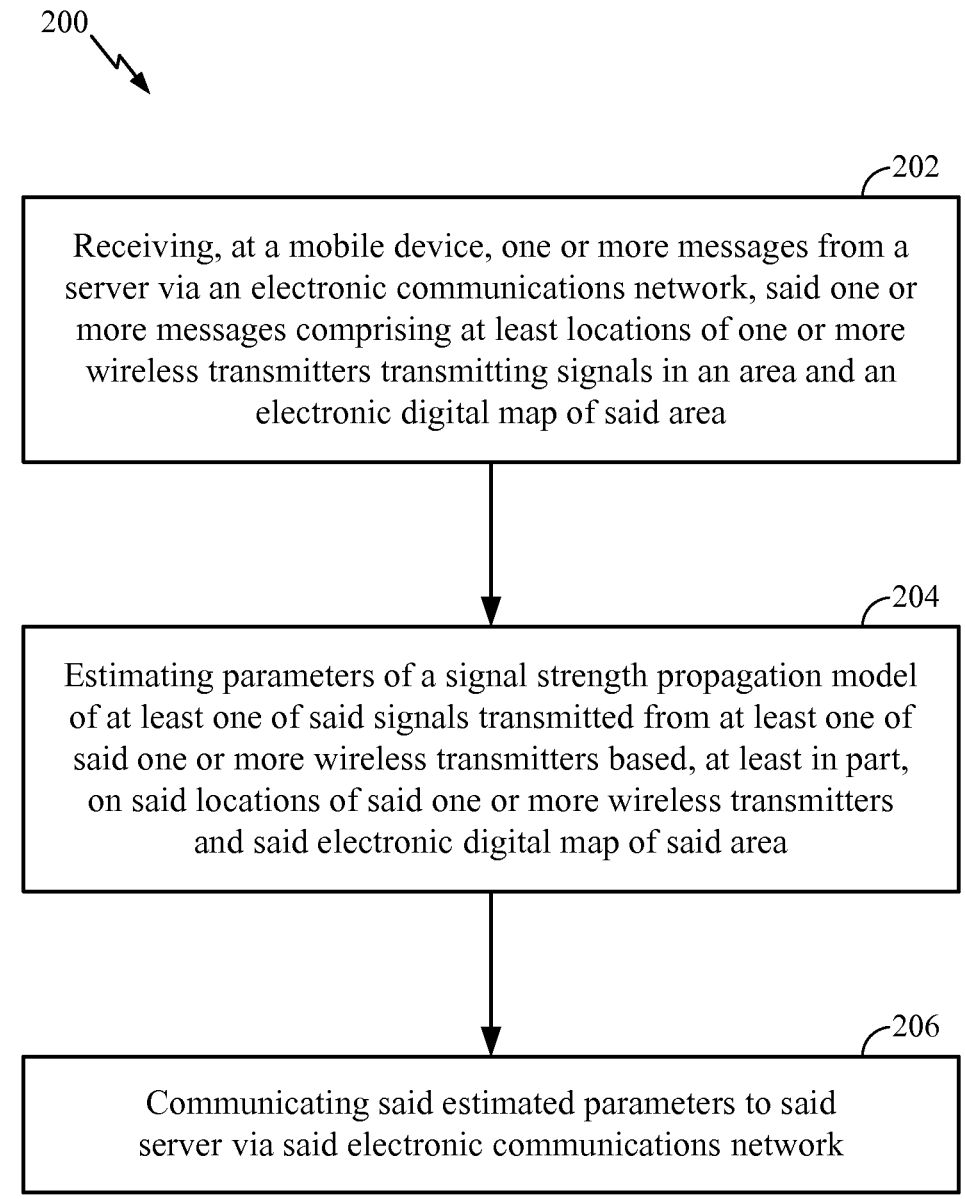
FIG. 2 is a flow diagram illustrating an implementation of an example process that may be performed to facilitate or support techniques for utilizing a mobile device to learn parameters of a radio heat map.

With this in mind, attention is now drawn to FIG. 2, which is a flow diagram illustrating an implementation of an example process 200 that may be performed, in whole or in part, to facilitate or support one or more operations or techniques for utilizing a mobile device, such as mobile device 102 of FIG. 1, for example, to learn parameters of a radio heat map. It should be noted that information acquired or produced, such as, for example, input signals, output signals, operations, results, etc. associated with example process 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 200 may, for example, begin at operation 202 with receiving, at a mobile device, one or more messages from a server via an electronic communications network, the one or more messages comprising at least locations of one or more wireless transmitters transmitting signals in an area and an electronic digital map of the area. As previously mentioned, locations of wireless transmitters and an electronic digital map may, for example, be communicated or provided to a mobile device by a suitable server (e.g., server 118, 120, etc. of FIG. 1) as part of positioning assistance data at or upon entry of an indoor or like area of interest, upon request, or the like. In some instances, provided positioning assistance data may, for example, be relevant to or cover an area identified by a coarse location of a mobile device or an adjacent area, as was also indicated.

With regard to operation 204, parameters of a signal strength propagation model of at least one of the signals transmitted from at least one of the one or more wireless transmitters may, for example, be estimated based, at least in part, on the locations of the one or more wireless transmitters and the electronic digital map of the area. The terms "parameters of a signal strength propagation model," "propagation parameters," "model parameters," or simply "parameters" may be used interchangeably herein. As mentioned above, in estimating propagation parameters, a probabilistic approach may, for example, be utilized, at least in part, or otherwise considered. For example, propagation parameters may be treated as or otherwise considered to be Gaussian distributed, meaning that the parameters may be more compactly or efficiently represented in terms of a mean and a covariance of a Gaussian distribution. As will be seen, such a representation may, for example, facilitate or support more efficient or effective computation of propagation parameters, mobile device-server communication, radio heat map learning, or localization.

Thus, in an implementation, to facilitate or support iterative estimation, an expectation-maximization (EM) type algorithm or approach may, for example, be utilized, at least in part. Thus, consider:

$$\mu = \left( \sum_{t=1}^{T} \frac{E(H_t'H_t)}{\sigma^2} + \frac{I}{\sigma_\theta^2} \right)^{-1} \left( \sum_{t=1}^{T} \frac{E(H_t')Y_t}{\sigma^2} + \frac{\mu_\theta}{\sigma_\theta^2} \right),$$

$$\Sigma = \left( \sum_{t=1}^{T} \frac{E(H_t'H_t)}{\sigma^2} + \frac{I}{\sigma_\theta^2} \right)^{-1}$$

where $\mu$ denotes a mean vector, $\Sigma$ denotes a covariance vector of a posterior distribution on a particular parameter of a radio heat map, and E denotes an expectation with respect to an estimated location of a mobile device (e.g., evaluated via a log-likelihood function, etc.). Here, under an assumption of linear parameteric-type learning mentioned above, a measured signal may, for example, be modeled or defined as:

$$Y_t = H_t \theta + w, \quad (1)$$

where $Y_t$ denotes a measurement of signal strength (e.g., RSSI in dB, etc.). A vector of unknown parameters is given by $\theta$, and w denotes additive white Gaussian noise with zero mean and standard deviation equal to $\sigma$. $H_t$ denotes a vector of coefficients associated with a particular model parameter, which may depend on a position of a mobile device (e.g., on a floor of an indoor area, etc.) and a location of a wireless transmitter. Prior knowledge of model parameters may be encoded by a mean $\mu_\theta$ and standard deviation $\sigma_\theta$. For example, $Y_t$ may be modeled as RSSI (e.g., in dB) according to the following path loss model:

$$Y_t = \theta_3 - \theta_1 10 \log_{10} d(s_t, AP) - \theta_2 n_{walls} + w. \quad (2)$$

As seen in this particular example, a number of parameters to be learned may, for example, be equal to three, as denoted by $\theta_1$, $\theta_2$, $\theta_3$. Each parameter may have a physical interpretation. For example, $\theta_3$ may correspond to a transmitted power of a wireless transmitter (e.g., an access point, etc.); $\theta_1$ may correspond to a propagation loss exponent (e.g., via a Euclidean distance); and $\theta_2$ may correspond to the amount of power absorbed by walls. Each parameter may be associated with a coefficient that may depend on a floor's topology, for example.

In the above example, $d(s_t, AP)$ denotes a Euclidean distance, in three dimensions, between a wireless transmitter and a mobile device defined by a point on a floor denoted by $s_t$. Similarly, $n_{walls}$ may correspond to a number of walls between a wireless transmitter and a point on a floor. Thus, consider:

$$H_t = [10 \log_{10} d(s_t, AP) n_{walls} 1] \quad (3)$$

It should be noted that, in some instances, such as if a concurrent or joint learning of a radio heat map and positioning of a mobile device is implemented or performed, for example, $s_t$ may correspond to a current estimate of a location of the mobile device. Since, at times, an estimate of a location of a mobile device may comprise a random variable, for example, a learning algorithm or approach may have an expectation E, as seen in expression (1) above with respect to this estimate.

Here, treating noise component w as being Gaussian, a vector of model parameters $\theta_1, \theta_2, \theta_3$ may, for example, be computed according to a least mean square error (LMSE) technique forming three-by-three covariance matrix, as was indicated. In one particular implementation, a learning algorithm or approach for estimating model parameters $\theta_1, \theta_2, \theta_3$ may be executed on a mobile device, for example, concurrently or jointly with estimating a position of a mobile device. Thus, for any particular wireless transmitter positioned at fixed location within an indoor or like environment, a mobile device may estimate parameters $\theta_1, \theta_2, \theta_3$ based, at least in part, on a location of the transmitter, an estimate of a location of a mobile device obtained contemporaneously with measurements of RSSI, and a number of walls separating the mobile device from the transmitter. Optionally or alternatively, model parameters $\theta_1, \theta_2, \theta_3$ may, for example, be estimated at a suitable server (e.g., server 118, 120, etc. of FIG. 1) based, at least in part, on crowdsourced measurements received from one or more other mobile devices in an area.

Thus, in operative use, a mobile device may, for example, compute values for $d(s_t, AP)$ based, at least in part, on a computed Euclidian distance between a known location of a wireless transmitter and estimated locations of a mobile device contemporaneously with measurements of RSSI. Overlaying a known location of a wireless transmitter and an estimated location of a mobile device onto a provided electronic digital map, the mobile device may, for example, compute a value for $n_{walls}$. Obtaining multiple data or measurement points, a mobile device may, for example, estimate parameters $\theta_1, \theta_2, \theta_3$. According to an embodiment, a mobile device may obtain estimates of its location using any suitable technique, such as, for example, applying inertial sensor measurements to dead reckon from a last know position fix (e.g., from a last position fix obtained in an outdoor area prior to entering an indoor area, etc.). Optionally or alternatively, a mobile device may apply RSSI measurements from three or more locations of wireless transmitters to respective model parameters obtained in expression (2), for example, in computing a position fix by trilateration. Thus, as illustrated, in at least one implementation, a mobile device may apply the aforementioned LMSE process to estimate parameters $\theta_1, \theta_2, \theta_3$, for example, and may estimate its location contemporaneously with measurements of RSSI.

As variance or covariance values converge to an acceptable confidence level, such as represented via a suitable threshold, for example, a mobile device may communicate estimated parameters $\theta_1, \theta_2, \theta_3$ to a server via the electronic communications network, as indicated at operation 206. A suitable threshold may be determined, at least in part, experimentally and may be pre-defined or configured, for example, or otherwise dynamically defined in some manner, depending on a particular application, environment, transmitter, or the like. In some instances, a fixed point-type threshold may, for example, be utilized, at least in part. As such, at times, a confidence level in one or more model parameters may be advantageously assessed based, at least in part, on a computed variance or covariance associated with at least one of the parameters, for example, and the parameters may be selectively transmitted to a server in response to the confidence level meeting a suitable threshold. With estimated parameters $\theta_1, \theta_2, \theta_3$ for multiple wireless transmitters, a server may then compute expected RSSI values at particular locations in an indoor or like area of interest as part of a radio heat map.

In some instances, more than three model parameters $\theta_1, \theta_2, \theta_3$ may be estimated, such as to characterize signal strength as a function of range, for example. As a way of illustration, if a number of model parameters is equal to four, then a mean for a parameter vector may comprise four values, for example, and, accordingly, a covariance matrix may comprise sixteen values. Since a covariance matrix may be symmetric, a mobile device may transmit or communicate to a suitable server four values (e.g., for a mean vector, etc.) and ten values (e.g., for a covariance matrix, etc.), rather than sixteen values. This may, for example, reduce or improve an overhead of transmission while maintaining intact desired information, as previously mentioned. A server may use communicated information or parameters, such as a mean and a covariance values, for example, from multiple users in different parts of an indoor or like area to learn or develop an associated radio heat map. A radio heat map may be subsequently provided to a new user for more effective or efficient localization.

Accordingly, as discussed herein, one or more operations or techniques for utilizing a mobile device to learn parameters of a radio heat map may provide benefits. For example, indoor positioning of a mobile device may be implemented or performed concurrently or jointly with learning a radio heat. This may facilitate or support ubiquitous indoor positioning, such as obtaining an accurate or suitable position fix in a newly-encountered indoor or like area of interest, for example. A signal strength propagation model discussed herein may also allow for more effective or efficient computation of model parameters (e.g., in seconds, etc.) as well as more effective or efficient mobile device-server communications, as was indicated. In addition, since a radio heat map is learned or developed by users of mobile devices, radio heat maps may be more easily deployable, thus, providing an advantage over more expensive site surveys, for example. Also, since there is little or no communication of current or live signal measurements to a server, privacy concerns with respect to locations of participating mobile devices may, for example, be eliminated or otherwise reduced. Of course, such a description of certain aspects of utilizing a mobile device to learn parameters of a radio heat map and its benefits is merely an example, and claimed subject matter is not so limited.

Figure 3:
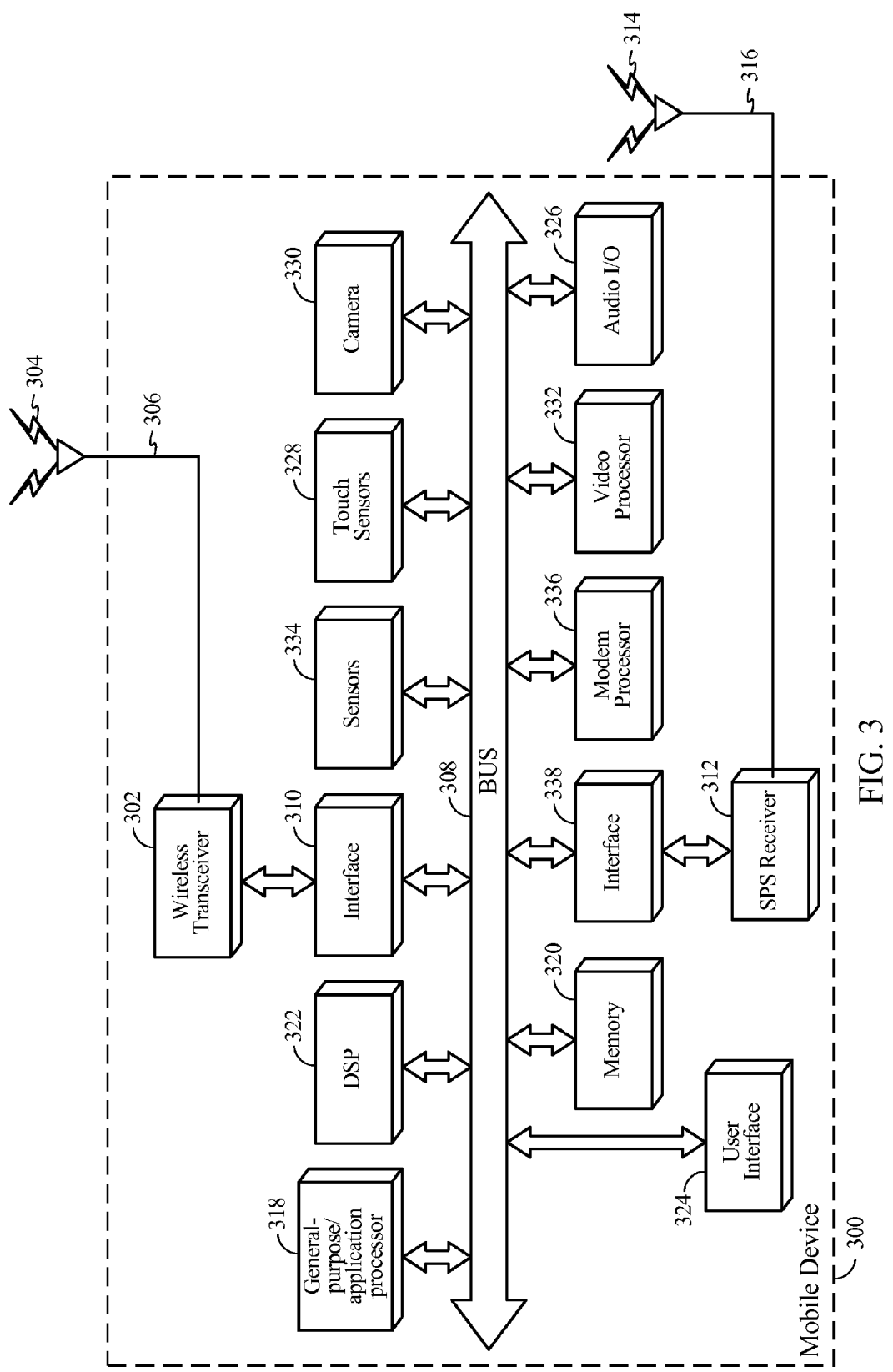
FIG. 3 is a schematic diagram illustrating an implementation of an example computing environment associated with a mobile device.

FIG. 3 is a schematic diagram of an implementation of an example computing environment associated with a mobile device that may be used, at least in part, to facilitate or support one or more operations or techniques for utilizing a mobile device to learn parameters of a radio heat map. An example computing environment may comprise, for example, a mobile device 300 that may include one or more features or aspects of mobile device 102 of FIG. 1, though claimed subject matter is not so limited. For example, in some instances, mobile device 300 may comprise a wireless transceiver 302 capable of transmitting or receiving wireless signals, referenced generally at 304, such as via an antenna 306 over a suitable wireless communications network. Wireless transceiver 302 may, for example, be capable of sending or receiving one or more suitable communications, such as one or more communications discussed with reference to FIG. 2, as one possible example.

By way of example but not limitation, in some instances, wireless transceiver 302 may comprise, for example, or be representative of means for receiving one or more messages from a server via an electronic communications network, the one or more messages comprising at least locations of one or more wireless transmitters transmitting signals in an area and an electronic digital map of the area, such as to implement operation 202 of FIG. 2, at least in part. In addition, in at least one implementation, wireless transceiver 302 may be representative of or comprise, for example, means for communicating the estimated parameters to the server via the electronic communications network, such as to implement operation 206 of FIG. 2, at least in part. Wireless transceiver 302 may, for example, be coupled or connected to a bus 308 via a wireless transceiver bus interface 310. Depending on an implementation, at times, wireless transceiver bus interface 310 may, for example, be at least partially integrated with wireless transceiver 302. Some implementations may include multiple wireless transceivers 302 or antennas 306 so as to enable transmitting or receiving signals according to a corresponding multiple wireless communication standards such as Wireless Fidelity (WiFi), Code Division Multiple Access (CDMA), Wideband-CDMA (W-CDMA), Long Term Evolution (LTE), Bluetooth®, just to name a few examples.

In an implementation, mobile device 300 may, for example, comprise an SPS or like receiver 312 capable of receiving or acquiring one or more SPS or other suitable wireless signals 314, such as via an SPS or like antenna 316. SPS receiver 312 may process, in whole or in part, one or more acquired SPS signals 314 for estimating a location, coarse or otherwise, of mobile device 300. In some instances, one or more general-purpose application processors 318 (henceforth referred to as "processor"), memory 320, digital signal processor(s) (DSP) 322, or like specialized devices or processors not shown may be utilized to process acquired SPS signals 314, in whole or in part, calculate a location of mobile device 300, such as in conjunction with SPS receiver 312, or the like. Storage of SPS or other signals for implementing one or more positioning operations, such as in connection with one or more techniques for utilizing a mobile device to learn parameters of a radio heat map, for example, may be performed, at least in part, in memory 320, suitable registers or buffers (not shown). Although not shown, it should be appreciated that in at least one implementation one or more processors 318, memory 320, DSPs 322, or like specialized devices or processors may comprise one or more processing modules capable of receiving, at a mobile device, one or more messages from a server via an electronic communications network, the one or more messages comprising at least locations of one or more wireless transmitters transmitting signals in an area and an electronic digital map of the area; estimating parameters of a signal strength propagation model of at least one of the signals transmitted from at least one of the one or more wireless transmitters based, at least in part, on the locations of the one or more wireless transmitters and the electronic digital map of the area; and communicating the estimated parameters to the server via the electronic communications network.

It should be noted that all or part of one or more processing modules may be implemented using or otherwise including hardware, firmware, software, or any combination thereof. Processing modules may be representative of one or more circuits capable of performing at least a portion of information computing technique or process. By way of example but not limitation, processor 318 or DSP 322 may include one or more processors, controllers, microprocessors, microcontrollers, application specific integrated circuits, digital signal processors, programmable logic devices, field programmable gate arrays, or the like, or any combination thereof. Thus, at times, processor 318 or DSP 322 or any combination thereof may comprise or be representative of means for estimating parameters of a signal strength propagation model of at least one of the signals transmitted from at least one of the one or more wireless transmitters based, at least in part, on the locations of the one or more wireless transmitters and the electronic digital map of said area, as illustrated in or described with respect to operation 204 of FIG. 2, for example.

As illustrated, DSP 322 may be coupled or connected to processor 318 and memory 320 via bus 308. Although not shown, in some instances, bus 308 may comprise one or more bus interfaces that may be integrated with one or more applicable components of mobile device 300, such as DSP 322, processor 318, memory 320, or the like. In various embodiments, one or more operations or functions described herein may be performed in response to execution of one or more machine-readable instructions stored in memory 320, such as on a computer-readable storage medium, such as RAM, ROM, FLASH, disc drive, etc., just to name a few examples. Instructions may, for example, be executable via processor 318, one or more specialized processors not shown, DSP 322, or the like. Memory 320 may comprise a non-transitory processor-readable memory, computer-readable memory, etc. that may store software code (e.g., programming code, instructions, etc.) that may be executable by processor 318, DSP 322, or the like to perform operations or functions described herein.

Mobile device 300 may comprise a user interface 324, which may include any one of several devices such as, for example, a speaker, microphone, display device, vibration device, keyboard, touch screen, etc., just to name a few examples. In at least one implementation, user interface 324 may enable a user to interact with one or more applications hosted on mobile device 300. For example, one or more devices of user interface 324 may store analog or digital signals on memory 320 to be further processed by DSP 322, processor 318, etc. in response to input or action from a user. Similarly, one or more applications hosted on mobile device 300 may store analog or digital signals in memory 320 to present an output signal to a user. In some implementations, mobile device 300 may optionally include a dedicated audio input/output (I/O) device 326 comprising, for example, a dedicated speaker, microphone, digital to analog circuitry, analog to digital circuitry, amplifiers, gain control, or the like. It should be understood, however, that this is merely an example of how audio I/O device 326 may be implemented, and that claimed subject matter is not limited in this respect. As seen, mobile device 300 may comprise one or more touch sensors 328 responsive to touching or like pressure applied on a keyboard, touch screen, or the like.

In an implementation, mobile device 300 may comprise, for example, a camera 330, dedicated or otherwise, such as for capturing still or moving imagery, or the like. Camera 330 may comprise, for example, a camera sensor or like imaging device (e.g., charge coupled device, complementary metal oxide semiconductor (CMOS)-type imager, etc.), lens, analog to digital circuitry, frame buffers, etc., just to name a few examples. In some instances, additional processing, conditioning, encoding, or compression of signals representing one or more captured images may, for example, be performed, at least in part, at processor 318, DSP 322, or the like. Optionally or alternatively, a video processor 332, dedicated or otherwise, may perform conditioning, encoding, compression, or manipulation of signals representing one or more captured images. Additionally, video processor 332 may, for example, decode or decompress one or more stored images for presentation on a display (not shown) of mobile device 300.

Mobile device 300 may comprise one or more sensors 334 coupled or connected to bus 308, such as, for example, one or more inertial sensors, ambient environment sensors, or the like. Inertial sensors of sensors 334 may comprise, for example, one or more accelerometers (e.g., collectively responding to acceleration of mobile device 300 in one, two, or three dimensions, etc.), gyroscopes or magnetometers (e.g., to support one or more compass or like applications, etc.), etc., just to illustrate a few examples. Ambient environment sensors of mobile device 300 may comprise, for example, one or more barometric pressure sensors, temperature sensors, ambient light detectors, camera sensors, microphones, etc., just to name few examples. Sensors 334 may generate analog or digital signals that may be stored in memory 320 and may be processed by DSP 322, processor 318, etc., such as in support of one or more applications directed to positioning or navigation operations, wireless communications, radio heat map learning, video gaming or the like.

In a particular implementation, mobile device 300 may comprise a modem processor 336, dedicated or otherwise, capable of performing baseband processing of signals received or downconverted via wireless transceiver 302, SPS receiver 312, or the like. Similarly, modem processor 336 may perform baseband processing of signals to be upconverted for transmission via wireless transceiver 302, for example. In alternative implementations, instead of having a dedicated modem processor, baseband processing may be performed, at least in part, by processor 318, DSP 322, or the like. In addition, in some instances, an interface 338, although illustrated as a separate component, may be integrated, in whole or in part, with one or more applicable components of mobile device 300, such as bus 308 or SPS receiver 312, for example. Optionally or alternatively, SPS receiver 312 may be coupled or connected to bus 308 directly. It should be understood, however, that these are merely examples of components or structures that may perform baseband processing, and that claimed subject matter is not limited in this regard.

Figure 4:
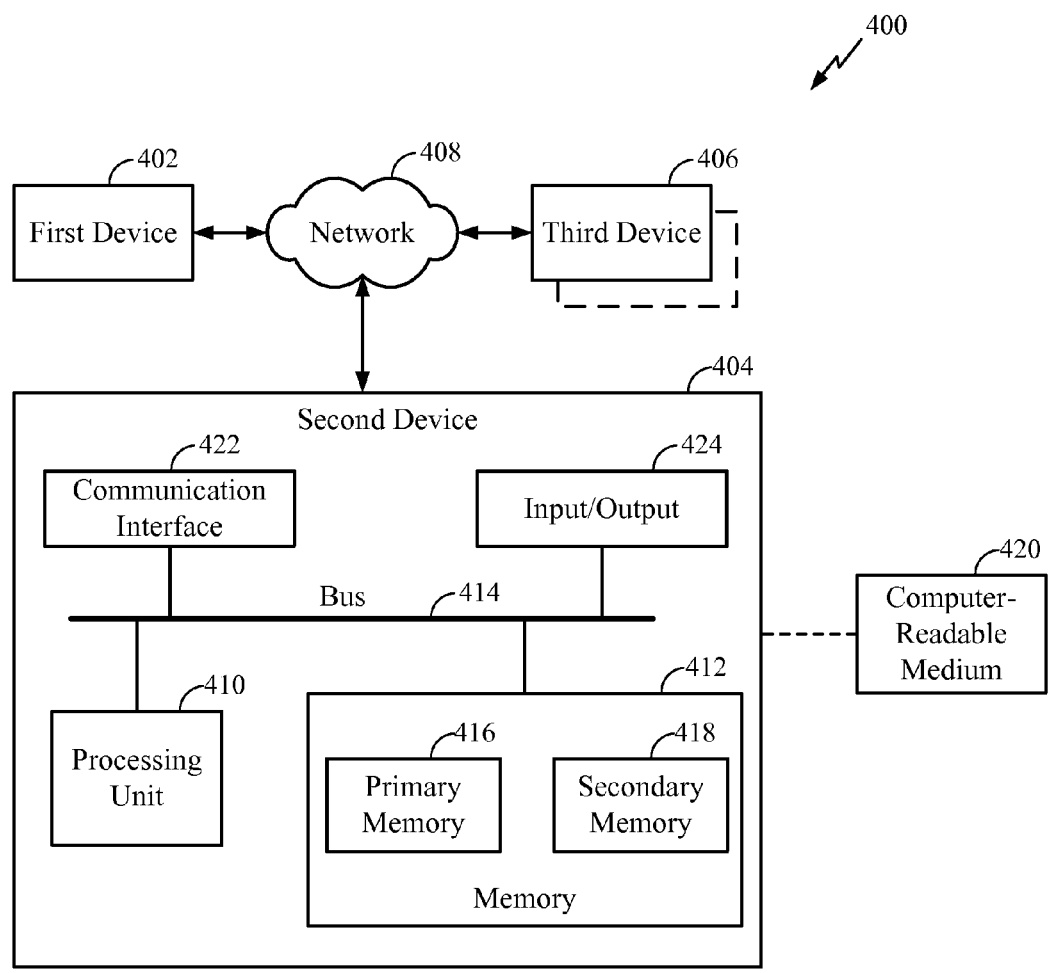
FIG. 4 is a schematic diagram illustrating an implementation of an example computing environment associated with a server.

FIG. 4 is a schematic diagram illustrating an implementation of an example computing environment or system 400 that may be associated with or include one or more servers or other devices capable of partially or substantially implementing or supporting one or more operations or techniques for utilizing a mobile device to learn parameters of a radio heat map, such as discussed above in connection with FIGS. 1-3, for example. Computing environment 400 may include, for example, a first device 402, a second device 404, a third device 406, etc., which may be operatively coupled together via a communications network 408. In some instances, first device 402 may comprise a server capable of providing positioning assistance data, such as, for example, identities or locations of known wireless transmitters, radio heat map, base station almanac, or the like. For example, first device 402 may also comprise a server capable of providing an electronic digital map to a mobile device based, at least in part, on a coarse or rough estimate of a location of the mobile device, upon request, or the like. First device 402 may also comprise a server capable of providing any other suitable indoor positioning assistance data (e.g., model parameters, etc.) relevant to a location of a mobile device. Second device 404 or third device 406 may comprise, for example, mobile devices, though claimed subject matter is not so limited. For example, in some instances, second device 404 may comprise a server functionally or structurally similar to first device 402, just to illustrate another possible implementation. In addition, communications network 408 may comprise, for example, one or more wireless transmitters, such as access points, femtocells, or the like. Of course, claimed subject matter is not limited in scope in these respects.

First device 402, second device 404, or third device 406 may be representative of any device, appliance, platform, or machine that may be capable of exchanging information over communications network 408. By way of example but not limitation, any of first device 402, second device 404, or third device 406 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 402, 404, and 406, respectively, may comprise one or more of a mobile device, wireless transmitter or receiver, server, etc. in accordance with example implementations described herein.

In an implementation, communications network 408 may be representative of one or more communication links, processes, or resources capable of supporting an exchange of information between at least two of first device 402, second device 404, or third device 406. By way of example but not limitation, communications network 408 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 406, there may be additional like devices operatively coupled to communications network 408. It is also recognized that all or part of various devices or networks shown in computing environment 400, or processes or methods, as described herein, may be implemented using or otherwise including hardware, firmware, software, or any combination thereof.

By way of example but not limitation, second device 404 may include at least one processing unit 410 that may be operatively coupled to a memory 412 via a bus 414. Processing unit 410 may be representative of one or more circuits capable of performing at least a portion of a suitable computing procedure or process. For example, processing unit 410 may include one or more processors, controllers, microprocessors, microcontrollers, application specific integrated circuits, digital signal processors, programmable logic devices, field programmable gate arrays, or the like, or any combination thereof.

Memory 412 may be representative of any information storage mechanism or appliance. Memory 412 may include, for example, a primary memory 416 and a secondary memory 418. Primary memory 416 may include, for example, a random access memory, read only memory, etc. While illustrated in this example as being separate from processing unit 410, it should be understood that all or part of primary memory 416 may be provided within or otherwise co-located/coupled with processing unit 410. Secondary memory 418 may include, for example, same or similar type of memory as primary memory or one or more information storage devices or systems, such as, for example, a disk drive, an optical disc drive, a tape drive, a solid state memory drive, etc. In certain implementations, secondary memory 418 may be operatively receptive of, or otherwise configurable to couple to, a computer-readable medium 420. Computer-readable medium 420 may include, for example, any non-transitory storage medium that may carry or make accessible information, code, or instructions for one or more of devices in computing environment 400. Computer-readable medium 420 may also be referred to as a storage medium.

Second device 404 may include, for example, a communication interface 422 that may provide for or otherwise support an operative coupling of second device 404 to at least communications network 408. By way of example but not limitation, communication interface 422 may include a network interface device or card, a modem, a router, a switch, a transceiver, and the like. Second device 404 may also include, for example, an input/output device 424. Input/output device 424 may be representative of one or more devices or features that may be configurable to accept or otherwise introduce human or machine inputs, or one or more devices or features that may be capable of delivering or otherwise providing for human or machine outputs. By way of example but not limitation, input/output device 424 may include an operatively configured display, speaker, keyboard, mouse, trackball, touch screen, information port, or the like.

Methodologies described herein may be implemented by various means depending upon applications according to particular features or examples. For example, methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, methodologies may be implemented with modules (e.g., procedures, functions, etc.) having instructions that perform functions described herein. Any computer-readable medium tangibly embodying instructions may be used in implementing methodologies described herein. For example, software codes may be stored in a memory and executed by a processor. Memory may be implemented within the processor or external to the processor. As used herein the term "memory" may refer to any type of long term, short term, volatile, non-volatile, or other memory and is not to be limited to any particular type of memory or number of memories, or type of media upon which memory is stored. In at least some implementations, one or more portions of the herein described storage media may store signals representative of information as expressed by a particular state of the storage media. For example, an electronic signal representative of information may be "stored" in a portion of the storage media (e.g., memory) by affecting or changing the state of such portions of the storage media to represent information as binary information (e.g., via ones and zeros). As such, in a particular implementation, such a change of state of the portion of the storage media to store a signal representative of information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to store desired program code in the form of instructions or information structures and that may be accessed by a computer or processor thereof. Disk and disc, as used herein, includes compact disc (CD), laser disc, optical disc, digital versatile disc (DVD), floppy disk and blue-ray disc where disks usually reproduce information magnetically, while discs reproduce information optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In an implementation, a mobile device may, for example, be capable of communicating with one or more femtocells, such as for the purpose of estimating its location, obtaining positioning assistance data, extending cellular telephone service into a business or home, or the like. As used herein, "femtocell" may refer to one or more smaller-size cellular base stations that may be capable of detecting a wireless signal transmitted from a mobile device using one or more appropriate techniques. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example, and may provide a mobile device access to a larger cellular telecommunication network by way of another broadband network, such as the Internet. However, such details relating to femtocells are merely examples, and claimed subject matter is not so limited.

Techniques described herein may be used with an SPS that includes any one of several GNSS or combinations of GNSS. Furthermore, techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal, etc.). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "space vehicle" (SV), as used herein, is intended to include terrestrial transmitters acting as pseudolites, equivalents of pseudolites, and possibly others. The terms "SPS signals" or "SV signals", as used herein, is intended to include SPS-like signals from terrestrial transmitters, including terrestrial transmitters acting as pseudolites or equivalents of pseudolites.

Also, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method of learning parameters of a radio heat map comprising:
   receiving, at a mobile device, one or more messages from a server via an electronic communications network, said one or more messages comprising at least locations of one or more wireless transmitters transmitting signals in an area and an electronic digital map of said area;
   estimating parameters of a signal strength propagation model of at least one of said signals transmitted from at least one of said one or more wireless transmitters based, at least in part, on said locations of said one or more wireless transmitters and said electronic digital map of said area, said parameters being estimated iteratively in said area based, at least in part, on an estimated power absorbed by a number of structural features causing path loss of said at least one of said signals, said structural features separating said at least one of said one or more wireless transmitters from an estimated location of said mobile device, said number of said structural features being determined via said electronic digital map of said area; and
   communicating said estimated parameters to said server via said electronic communications network.

2. The method of claim 1, wherein said estimating said parameters further comprises:
   estimating said parameters based, at least in part, on a number of walls comprising said structural features and separating said at least one of said one or more wireless transmitters from said estimated location of said mobile device based, at least in part, on said electronic digital map of said area.

3. The method of claim 1, wherein said estimating said parameters further comprises:
   estimating a location of said mobile device based, at least in part, on said signal strength propagation model and said estimated parameters, wherein said estimating said location is contemporaneous with measurements of a received signal strength of said signals in said area; and
   computing said parameters based, at least in part, on said estimated location of said mobile device.

4. The method of claim 1, wherein said communicating said estimated parameters comprises:
   assessing a confidence level in said parameters based, at least in part, on a computed variance or covariance associated with at least one of said parameters; and
   selectively transmitting said parameters to said server in response to said confidence level meeting a threshold.

5. The method of claim 1, wherein said parameters comprise at least one of the following: an estimated transmission power of said at least one of said one or more wireless transmitters; an estimated propagation loss exponent; an estimated power absorbed by a number of walls separating said at least one of said one or more wireless transmitters from said estimated location of said mobile device; or any combination thereof.

6. The method of claim 1, wherein said parameters are estimated concurrently with determining a location of said mobile device in said area.

7. The method of claim 1, and further comprising storing said estimated parameters as a part of said radio heat map.

8. The method of claim 1, wherein said signal strength propagation model is based, at least in part, on locations of said one or more wireless transmitters.

9. The method of claim 1, wherein said signal strength propagation model is associated with a single wireless transmitter of said one or more wireless transmitters.

10. The method of claim 1, wherein said signal strength propagation model is associated with a plurality of said one or more wireless transmitters.

11. The method of claim 1, wherein said area is characterized by a plurality of signal strength propagation models.

12. An apparatus to learn parameters of a radio heat map comprising:
   a mobile device comprising:
      a wireless transceiver to communicate with an electronic communications network; and
      one or more processors configured to:
         communicate with said electronic communications network to receive one or more messages from a server via said electronic communications network, said one or more messages comprising at least locations of one or more wireless transmitters transmitting signals in an area and an electronic digital map of said area;
         estimate parameters of a signal strength propagation model of at least one of said signals transmitted from at least one of said one or more wireless transmitters based, at least in part, on said locations of said one or more wireless transmitters and said electronic digital map of said area, said parameters being estimated iteratively in said area based, at least in part, on an estimated power absorbed by a number of structural features causing path loss of said at least one of said signals, said structural features separating said at least one of said one or more wireless transmitters from an estimated location of said mobile device, said number of said structural features being determined via said electronic digital map of said area; and
         communicate said estimated parameters to said server via said electronic communications network.

13. The apparatus of claim 12, wherein said one or more processors to estimate parameters of said signal strength propagation model further to:
   estimate said parameters based, at least in part, on a number of walls comprising said structural features and separating said at least one of said one or more wireless transmitters from said estimated location of said mobile device based, at least in part, on said electronic digital map of said area.

14. The apparatus of claim 12, wherein said one or more processors to estimate parameters of said signal strength propagation model further to:
   estimate a location of said mobile device based, at least in part, on said signal strength propagation model and said estimated parameters, wherein said estimate is contemporaneous with measurements of a received signal strength of said signals in said area; and
   compute said parameters based, at least in part, on said estimate of said location of said mobile device.

15. The apparatus of claim 12, wherein said one or more processors further to:
   assess a confidence level in said parameters based, at least in part, on a computed variance or covariance associated with at least one of said parameters; and
   said wireless transceiver to further selectively transmit said parameters to said server in response to said confidence level meeting a threshold.

16. An apparatus to learn parameters of a radio heat map comprising:
- means for receiving, at a mobile device, one or more messages from a server via an electronic communications network, said one or more messages comprising at least locations of one or more wireless transmitters transmitting signals in an area and an electronic digital map of said area;
- means for estimating parameters of a signal strength propagation model of at least one of said signals transmitted from at least one of said one or more wireless transmitters based, at least in part, on said locations of said one or more wireless transmitters and said electronic digital map of said area, said parameters being estimated iteratively in said area based, at least in part, on an estimated power absorbed by a number of structural features causing path loss of said at least one of said signals, said structural features separating said at least one of said one or more wireless transmitters from an estimated location of said mobile device, said number of said structural features being determined via said electronic digital map of said area; and
- means for communicating said estimated parameters to said server via said electronic communications network.

17. The apparatus of claim 16, wherein said means for estimating said parameters further comprises:
- means for estimating said parameters based, at least in part, on a number of walls comprising said structural features and separating said at least one of said one or more wireless transmitters from said estimated location of said mobile device based, at least in part, on said electronic digital map of said area.

18. The apparatus of claim 16, wherein said means for estimating said parameters further comprises:
- means for estimating a location of said mobile device based, at least in part, on said signal strength propagation model and said estimated parameters, wherein said means for estimating said location comprises means for estimating said location contemporaneous with measurements of a received signal strength of said signals in said area; and
- means for computing said parameters based, at least in part, on said estimated location of said mobile device.

19. The apparatus of claim 16, wherein said means for communicating said estimated parameters comprises:
- means for assessing a confidence level in said parameters based, at least in part, on a computed variance or covariance associated with at least one of said parameters; and
- means for selectively transmitting said parameters to said server in response to said confidence level meeting a threshold.

20. The apparatus of claim 16, wherein said parameters comprise at least one of the following: an estimated transmission power of said at least one of said one or more wireless transmitters; an estimated propagation loss exponent; an estimated power absorbed by a number of walls separating said at least one of said one or more wireless transmitters from said estimated location of said mobile device; or any combination thereof.

21. The apparatus of claim 16, wherein said signal strength propagation model is based, at least in part, on said locations of said one or more wireless transmitters.

22. The apparatus of claim 16, wherein said area is characterized by a plurality of signal strength propagation models.

23. An article of manufacture comprising:
- a non-transitory storage medium having instructions executable by a processor to:
  - receive, at a mobile device, one or more messages from a server via an electronic communications network, said one or more messages comprising at least locations of one or more wireless transmitters transmitting signals in an area and an electronic digital map of said area;
  - estimate parameters of a signal strength propagation model of at least one of said signals transmitted from at least one of said one or more wireless transmitters based, at least in part, on said locations of said one or more wireless transmitters and said electronic digital map of said area, said parameters being estimated iteratively in said area based, at least in part, on an estimated power absorbed by a number of structural features causing path loss of said at least one of said signals, said structural features separating said at least one of said one or more wireless transmitters from an estimated location of said mobile device, said number of said structural features being determined via said electronic digital map of said area; and
  - communicate said estimated parameters to said server via said electronic communications network.

24. The article of manufacture of claim 23, wherein said storage medium further comprises instructions to:
- estimate said parameters based, at least in part, on a number of walls comprising said structural features and separating said at least one of said one or more wireless transmitters from said estimated location of said mobile device based, at least in part, on said electronic digital map of said area.

25. The article of manufacture of claim 23, wherein said storage medium further comprises instructions to:
- estimate a location of said mobile device based, at least in part, on said signal strength propagation model and said estimated parameters, wherein said estimate is contemporaneous with measurements of a received signal strength of said signals in said area; and
- compute said parameters based, at least in part, on said estimate of said location of said mobile device.

26. The article of manufacture of claim 23, wherein said storage medium further comprises instructions to:
- assess a confidence level in said parameters based, at least in part, on a computed variance or covariance associated with at least one of said parameters; and
- selectively transmit said parameters to said server in response to said confidence level meeting a threshold.

* * * * *